(12) United States Patent
Rendell

(10) Patent No.: US 10,471,365 B2
(45) Date of Patent: Nov. 12, 2019

(54) REMOTELY CONTROLLED VEHICLE ASSEMBLY

(71) Applicant: Sherry Rendell, Merrillville, IN (US)

(72) Inventor: Sherry Rendell, Merrillville, IN (US)

( * ) Notice: Subject to any disclaimer, the term of this patent is extended or adjusted under 35 U.S.C. 154(b) by 0 days.

(21) Appl. No.: 15/920,045

(22) Filed: Mar. 13, 2018

(65) Prior Publication Data

US 2019/0282916 A1    Sep. 19, 2019

(51) Int. Cl.
| | | |
|---|---|---|
| A63H 30/04 | (2006.01) | |
| B62D 1/24 | (2006.01) | |
| B62D 5/04 | (2006.01) | |
| B60K 1/00 | (2006.01) | |

(52) U.S. Cl.
CPC ............ *A63H 30/04* (2013.01); *B60K 1/00* (2013.01); *B62D 1/24* (2013.01); *B62D 5/0421* (2013.01); *B62D 5/0442* (2013.01)

(58) Field of Classification Search
CPC ...... A63H 33/00; A63H 33/04; A63H 33/005; A63H 18/16; Y10S 180/097; Y10S 280/005; B62D 1/24; B62D 1/28
USPC .......... 180/55, 56, 65.1, 65.8, 167; 446/431, 446/441, 448, 454, 456, 460, 462, 465, 446/466, 468–470
See application file for complete search history.

(56) References Cited

U.S. PATENT DOCUMENTS

| | | |
|---|---|---|
| 5,816,352 A | 10/1998 | Hacker |
| 6,783,425 B2 * | 8/2004 | McKeefery ............ A63H 30/04 180/167 |
| D506,512 S | 6/2005 | Rasberry |
| 6,915,871 B2 | 7/2005 | Gavish |
| 7,344,430 B2 | 3/2008 | Hasty |
| 7,438,148 B1 | 10/2008 | Crea |
| 2005/0029090 A1 * | 2/2005 | Yamaguchi ........... C23C 14/046 204/192.12 |
| 2007/0034433 A1 | 2/2007 | Gabriele |
| 2010/0167625 A1 | 7/2010 | Conway |

FOREIGN PATENT DOCUMENTS

WO    WO2004075456    9/2004

* cited by examiner

*Primary Examiner* — Kien T Nguyen

(57) ABSTRACT

A remotely controlled vehicle assembly includes a vehicle that may have a child seated therein. The vehicle has a pair of rear and front wheels. A drive unit is coupled to the vehicle and the drive unit is mechanically coupled to each of the rear wheels. In this way the drive unit selectively urges the vehicle along the support surface. A steering unit is coupled to the vehicle and the steering unit is mechanically coupled to each of the front wheels. In this way the steering unit steers the vehicle on the support surface. A remote control unit is provided and the remote control is manipulated by a caregiver. The remote control is in electrical communication with each of the drive unit and the steering unit. In this way the remote control unit facilitates the caregiver to control motion of the vehicle.

14 Claims, 4 Drawing Sheets

REMOTELY CONTROLLED VEHICLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to vehicle devices and more particularly pertains to a new vehicle device for facilitating a caregiver to remotely drive a vehicle with a child seated therein.

BRIEF SUMMARY OF THE INVENTION

An embodiment of the disclosure meets the needs presented above by generally comprising a vehicle that may have a child seated therein. The vehicle has a pair of rear and front wheels. A drive unit is coupled to the vehicle and the drive unit is mechanically coupled to each of the rear wheels. In this way the drive unit selectively urges the vehicle along the support surface. A steering unit is coupled to the vehicle and the steering unit is mechanically coupled to each of the front wheels. In this way the steering unit steers the vehicle on the support surface. A remote control unit is provided and the remote control is manipulated by a caregiver. The remote control is in electrical communication with each of the drive unit and the steering unit. In this way the remote control unit facilitates the caregiver to control motion of the vehicle.

There has been thus outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
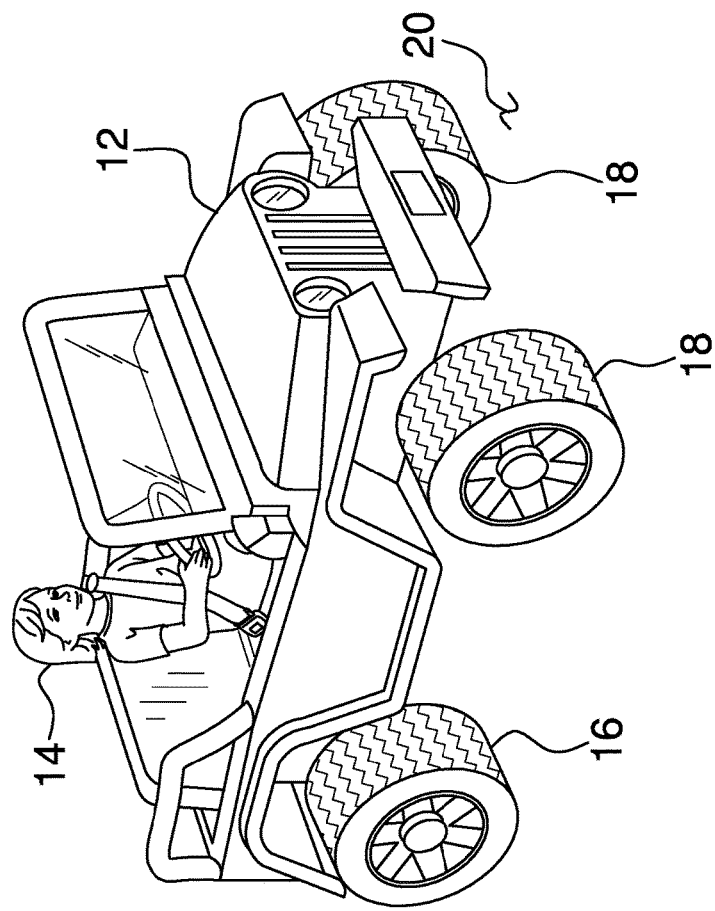
FIG. 1 is a perspective in-use view of a remotely controlled vehicle assembly according to an embodiment of the disclosure.
Figure 1:
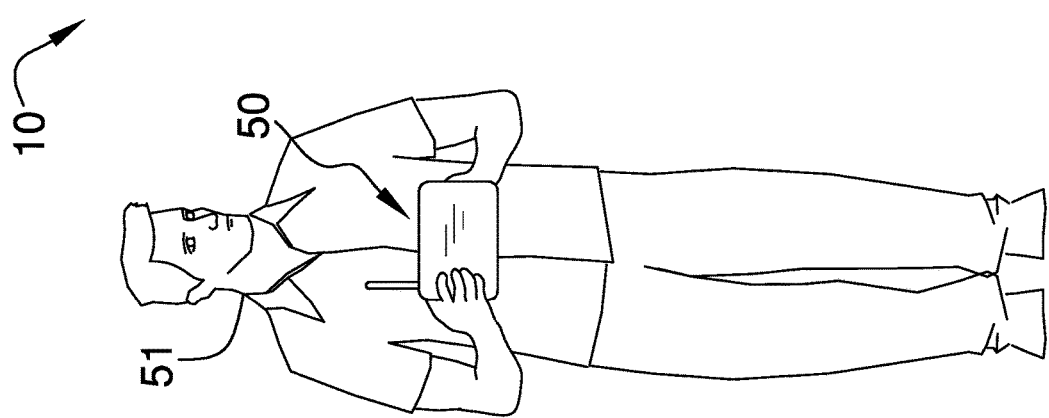
Figure 2:
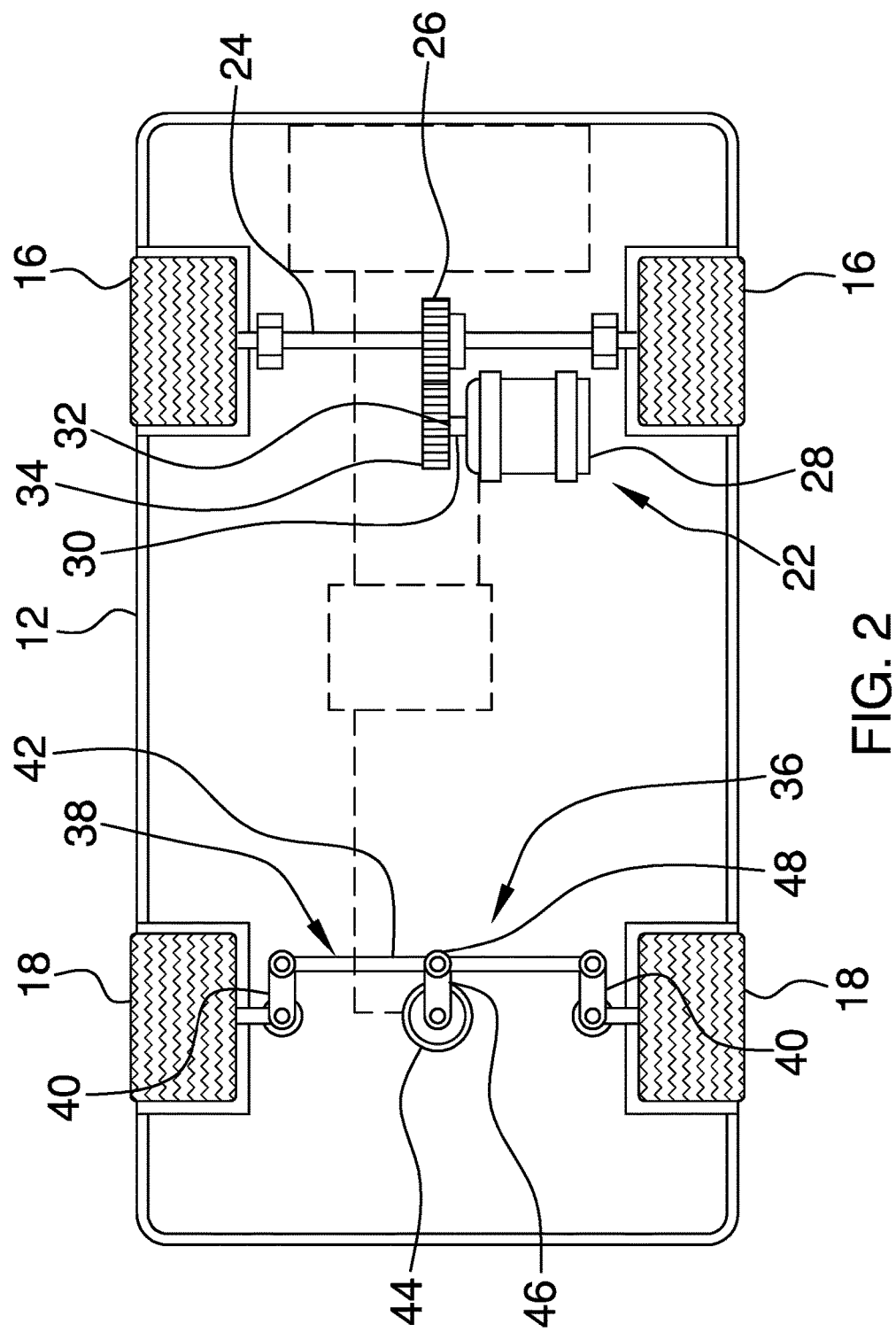
FIG. 2 is a bottom phantom view of vehicle of an embodiment of the disclosure.
Figure 3:
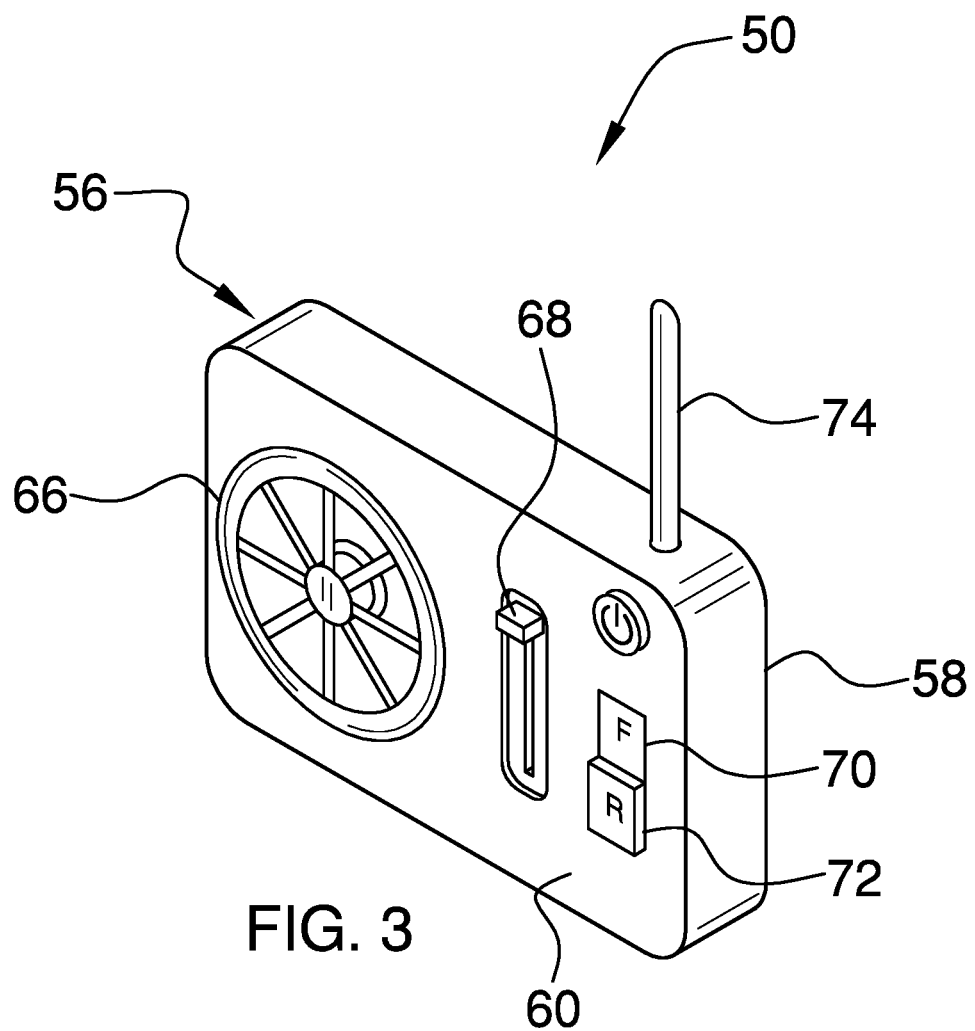
FIG. 3 is a perspective view of remote control unit of an embodiment of the disclosure.
Figure 4:
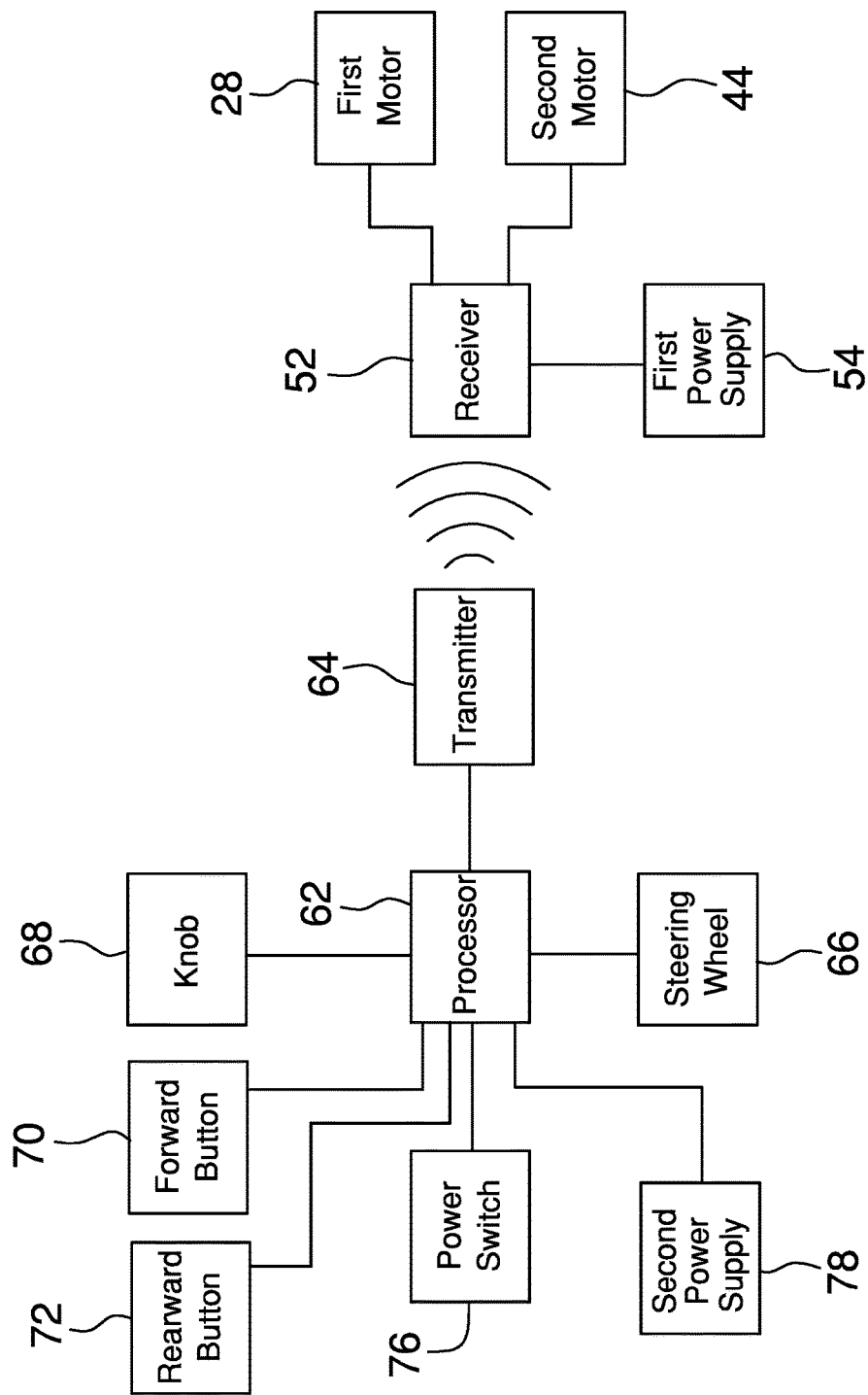
FIG. 4 is a schematic view of an embodiment of the disclosure.

With reference now to the drawings, and in particular to FIGS. 1 through 4 thereof, a new vehicle device embodying the principles and concepts of an embodiment of the disclosure and generally designated by the reference numeral 10 will be described.

As best illustrated in FIGS. 1 through 4, the remotely controlled vehicle assembly 10 generally comprises a vehicle 12 that may have a child 14 seated therein. The vehicle 12 has a pair of rear wheels 16 and each of the rear wheels 16 is rotatably coupled to the vehicle 12. The vehicle 12 has a pair of front wheels 18 and each of the front wheels 18 is rotatably coupled to the vehicle 12. Each of the front wheels 18 and each of the rear wheels 16 roll along a support surface 20. The support surface 20 may be ground and the vehicle 12 may be structured to resemble a passenger vehicle 12. The vehicle 12 may have a seat and the child 14 may be seated on the seat. The vehicle 12 may further include a seatbelt to restrain the child 14 in the seat. Moreover, the vehicle 12 may have a steering wheel to facilitate the child 14 to pretend to steer the vehicle 12.

A drive unit 22 is provided and the drive unit 22 is coupled to the vehicle 12. The drive unit 22 is mechanically coupled to each of the rear wheels 16 to selectively urge the vehicle 12 along the support surface 20. The drive unit 22 comprises an axle 24 extending between each of the rear wheels 16. A first gear 26 is positioned around the axle 24 and a first motor 28 is coupled to the vehicle 12. The first motor 28 selectively rotates in a forward direction and a rearward direction. Moreover, the first motor 28 may be an electric motor or the like.

A shaft 30 is coupled to the first motor 28 such that the first motor 28 rotates the shaft 30 when the first motor is turned on. The shaft 30 has a distal end 32 with respect to the first motor 28. A second gear 34 is coupled to the distal end 32 of the shaft 30 such that the shaft 30 rotates the second gear 34 when the motor is turned on. The second gear 34 engages the first gear 26 such that the second gear 34 rotates the axle 24 when the first motor is turned on.

A steering unit 36 is provided and the steering unit 36 is coupled to the vehicle 12. The steering unit 36 is mechanically coupled to each of the front wheels 18 to steer the vehicle 12 on the support surface 20. The steering unit 36 comprises a linkage 38 that is coupled between each of the front wheels 18. The linkage 38 comprises a pair of control arms 40 and each of the control arms 40 is movably coupled to an associated one of the front wheels 18. A member 42 is hingedly coupled between each of the control arms 40. The member 42 selectively urges each of the control arms 40 to rotate the associated front wheels 18 about a vertical axis to steer the vehicle 12.

A second motor 44 is coupled to the vehicle 12 and the second motor 44 selectively rotates in a first direction and a second direction. The second motor 44 may be an electric motor or the like. An arm 46 is coupled to the second motor 44 and the arm 46 is oriented perpendicular to a rotational axis of the second motor 44. The arm 46 has a distal end 48 with respect to the second motor 44.

The arm 46 is selectively urged to swing in a first direction when the second motor 44 rotates in the first direction. Additionally, the arm 46 is selectively urged to swing in a second direction when the second motor 44 rotates in the second direction. The distal end 48 of the arm 46 is coupled to the member 42 of the linkage 38. In this way the member 42 urges each of the front wheels 18 to turn in a first direction when the arm 46 is urged in the first direction. Moreover, the member 42 urges each of the front wheels 18 to turn in a second direction when the arm 46 is urged in the second direction.

A remote control unit 50 provided and the remote control unit 50 is selectively manipulated by a caregiver 51. The caregiver 51 may be an adult or a parent of the child 14. The remote control unit 50 is in electrical communication with each of the drive unit 22 and the steering unit 36. Thus, the caregiver 51 controls motion of the vehicle 12 thereby facilitating the child 14 to enjoy simulated driving without putting the child 14 at risk of inadvertently driving into a roadway or other hazardous area.

The remote control unit 50 comprises a receiver 52 that is coupled to the vehicle 12. The receiver 52 is electrically coupled to each of the first motor 28 and the second motor 44. Moreover, the receiver 52 may be a radio frequency receiver 52 or the like. A first power supply 54 is coupled to the vehicle 12 and the first power supply 54 is electrically coupled to the receiver 52. The first power supply 54 comprises at least one rechargeable battery.

A control 56 is provided and the control 56 is manipulated by the caregiver 51. The control 56 comprises a housing 58 that is gripped by the caregiver 51 and the housing 58 has a first wall 60. A processor 62 is positioned within the housing 58 and the processor 62 may be an electronic processor 62 or the like. A transmitter 64 is positioned within the housing 58 and the transmitter 64 is electrically coupled to the processor 62. The transmitter 64 is in electrical communication with the receiver 52 and the transmitter 64 may be a radio frequency transmitter 64 or the like.

A steering wheel 66 is provided and the steering wheel 66 is rotatably coupled to the first wall 60 of the housing 58. The steering wheel 66 is selectively manipulated by the caregiver 51 to steer the vehicle 12. The steering wheel 66 is electrically coupled to the processor 62 and the steering wheel 66 is selectively rotated in a first direction. The second motor 44 rotates in the first direction when the steering wheel 66 is rotated in the first direction. In this way the vehicle 12 turns left on the support surface 20. The steering wheel 66 is selectively rotated in a second direction. The second motor 44 rotates in the second direction when the steering wheel 66 is rotated in the second direction. Thus, the vehicle 12 turns right on the support surface 20.

A knob 68 is slidably coupled to the first wall 60 of the housing 58 and the knob 68 is selectively manipulated. The knob 68 is electrically coupled to the processor 62 and the knob 68 is selectively urged between a minimum position and a maximum position. The first motor 28 is turned on to rotate between a minimum speed and a maximum speed corresponding to a position of the knob 68. In this way the knob 68 is manipulated to control 56 a speed of the vehicle 12.

A forward button 70 is coupled to the first wall 60 of the housing 58 and the forward button 70 is selectively manipulated. The forward button 70 is electrically coupled to the processor 62. The first motor 28 rotates in the forward direction when the forward button 70 is manipulated. In this way the vehicle 12 travels forwardly along the support surface 20 when the knob 68 is manipulated.

A rearward button 72 is coupled to the first wall 60 of the housing 58 and the rearward button 72 is selectively manipulated. The rearward button 72 is electrically coupled to the processor 62. The first motor 28 rotates in the rearward direction when the rearward button 72 is manipulated. In this way the vehicle 12 travels rearwardly along the support surface 20 when the knob 68 is manipulated.

An antenna 74 is coupled to and extends away from the housing 58. The antenna 74 is electrically coupled to the transmitter 64 to broadcasts a signal generated by the transmitter 64. A power switch 76 is coupled to the first wall 60 of the housing 58 and the power switch 76 is selectively manipulated. The power switch 76 is electrically coupled to the processor 62 such that the power switch 76 turns the processor 62 on and off. A second power supply 78 is positioned within the housing 58 and the second power supply 78 is electrically coupled to the processor 62. The second power supply 78 comprising at least one battery.

In use, the child 14 is seated in the vehicle 12 and the control 56 is gripped by the caregiver 51. The caregiver 51 selectively manipulates the forward button 70 and the knob 68 to urge the vehicle 12 to travel forwardly at a selected speed. The steering wheel 66 on the control 56 is manipulated to steer the vehicle 12 while the vehicle 12 is moving. The caregiver 51 selectively manipulates the rearward button 72 and the knob 68 to urge the vehicle 12 to travel rearwardly at a selected speed. In this way the caregiver 51 has control 56 over the vehicle 12 thereby facilitating the child 14 to enjoy simulated driving without allowing the child 14 to inadvertently drive the vehicle 12 into a hazardous situation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely controlled vehicle assembly being configured to have a child seated therein thereby facilitating the child to be driven by a caregiver, said assembly comprising:
    a vehicle being configured to have a child seated therein, said vehicle having a pair of rear wheels and a pair of front wheels, each of said front wheels and each of said rear wheels being configured to roll along a support surface;
    a first motor being coupled to said vehicle;
    a drive unit being coupled to said vehicle, said drive unit being mechanically coupled to each of said rear wheels wherein said drive unit is configured to selectively urge said vehicle along the support surface;
    a steering unit being coupled to said vehicle, said steering unit being mechanically coupled to each of said front wheels wherein said steering unit is configured to steer said vehicle on the support surface, said steering unit comprising
        a second motor being coupled to said vehicle, said second motor selectively rotating in a first direction and a second direction, and
        an arm being coupled to said second motor, said arm being oriented perpendicular to a rotational axis of said second motor, said arm having a distal end with respect to said second motor, said arm being selectively urged to swing in a first direction when said second motor rotates in said first direction, said arm being selectively urged to swing in a second direction when said second motor rotates in said second direction; and
    a remote control unit, said remote control being in electrical communication with each of said drive unit and said steering unit wherein said remote control unit is configured to facilitate the caregiver to control motion of said vehicle, said remote control unit comprising
        a receiver, and
        a control being configured to be manipulated by the caregiver, said control comprising
            a housing being configured to be gripped, said housing having a first wall,
            a processor being positioned within said housing,
            a transmitter being positioned within said housing, said transmitter being electrically coupled to said processor, said transmitter being in electrical communication with said receiver, and
            a steering wheel being rotatably coupled to said first wall of said housing wherein said steering wheel is configured to be manipulated by the caregiver, said steering wheel being electrically coupled to said processor.

2. The assembly according to claim 1, wherein said drive unit comprises:
    an axle extending between each of said rear wheels; and
    a first gear being positioned around said axle.

3. The assembly according to claim 1, further comprising: said first motor selectively rotating in a forward direction and a rearward direction; and
    a shaft being coupled to said first motor such that said first motor rotates said shaft when said first motor is turned on, said shaft having a distal end with respect to said first motor.

4. The assembly according to claim 3, further comprising:
    an axle;
    a first gear being coupled around said axle; and
    a second gear being coupled to said distal end of said shaft such that said shaft rotates said second gear when said first motor is turned on, said second gear engaging said first gear such that said second gear rotates said axle when said first motor is turned on.

5. The assembly according to claim 1, wherein said steering unit comprises a linkage being coupled between each of said front wheels.

6. The assembly according to claim 5, wherein said linkage comprises:
    a pair of control arms, each of said control arms being movably coupled to an associated one of said front wheels; and
    a member being hingedly coupled between each of said control arms, said member selectively urging each of said control arms to rotate said associated front wheels about a vertical axis wherein said member is configured to steer said vehicle.

7. The assembly according to claim 1, wherein:
    said steering unit includes a linkage, said linkage including a member; and
    said distal end of said arm is coupled to said member of said linkage, said member urging each of said front wheels to turn in a first direction when said arm is urged in said first direction, said member urging each of said front wheels to turn in a second direction when said arm is urged in said second direction.

8. The assembly according to claim 1, wherein:
    said drive unit includes a first motor;
    said receiver being electrically coupled to each of said first motor and said second motor.

9. The assembly according to claim 8, further comprising a first power supply being coupled to said vehicle, said first power supply being electrically coupled to said receiver, said first power supply comprising at least one battery.

10. The assembly according to claim 1, wherein
    said steering wheel is selectively rotated in a first direction, said second motor rotating in said first direction when said steering wheel is rotated in said first direction wherein said vehicle is configured to turn left on the support surface, said steering wheel being selectively rotated in a second direction, said second motor rotating in said second direction when said steering wheel is rotated in said second direction wherein said vehicle is configured to turn right on the support surface.

11. The assembly according to claim 1, further comprising:
    a first motor;
    a knob being slidably coupled to said first wall of said housing wherein said knob is configured to be manipulated, said knob being electrically coupled to said processor, said knob being selectively urged between a minimum position and a maximum position, said first motor being turned on to rotate between a minimum speed and a maximum speed corresponding to a position of said knob;
    a forward button being coupled to said first wall of said housing wherein said forward button is configured to be manipulated, said forward button being electrically coupled to said processor, said first motor rotating in said forward direction when said forward button is manipulated wherein said vehicle is configured to travel forwardly along the support surface; and
a rearward button being coupled to said first wall of said housing wherein said rearward button is configured to be manipulated, said rearward button being electrically coupled to said processor, said first motor rotating in said rearward direction when said rearward button is manipulated wherein said vehicle is configured to travel rearwardly along the support surface.

12. The assembly according to claim 1, further comprising an antenna being coupled to and extending away from said housing, said antenna being electrically coupled to said transmitter such that said antenna broadcasts a signal generated by said transmitter.

13. The assembly according to claim 12, further comprising:
a power switch being coupled to said first wall of said housing wherein said power switch is configured to be manipulated, said power switch being electrically coupled to said processor such that said power switch turns said processor on and off; and
a second power supply being positioned within said housing, said second power supply being electrically coupled to said processor, said second power supply comprising at least one battery.

14. A remotely controlled vehicle assembly being configured to have a child seated therein thereby facilitating the child to be driven by a caregiver, said assembly comprising:
a vehicle being configured to have a child seated therein, said vehicle having a pair of rear wheels, each of said rear wheels being rotatably coupled to said vehicle, said vehicle having a pair of front wheels, each of said front wheels being rotatably coupled to said vehicle, each of said front wheels and each of said rear wheels being configured to roll along a support surface;
a drive unit being coupled to said vehicle, said drive unit being mechanically coupled to each of said rear wheels wherein said drive unit is configured to selectively urge said vehicle along the support surface, said drive unit comprising:
an axle extending between each of said rear wheels,
a first gear being positioned around said axle,
a first motor being coupled to said vehicle, said first motor selectively rotating in a forward direction and a rearward direction,
a shaft being coupled to said first motor such that said first motor rotates said shaft when said first motor is turned on, said shaft having a distal end with respect to said first motor,
a second gear being coupled to said distal end of said shaft such that said shaft rotates said second gear when said first motor is turned on, said second gear engaging said first gear such that said second gear rotates said axle when said first motor is turned on;
a steering unit being coupled to said vehicle, said steering unit being mechanically coupled to each of said front wheels wherein said steering unit is configured to steer said vehicle on the support surface, said steering unit comprising:
a linkage being coupled between each of said front wheels, said linkage comprising:
a pair of control arms, each of said control arms being movably coupled to an associated one of said front wheels, and
a member being hingedly coupled between each of said control arms, said member selectively urging each of said control arms to rotate said associated front wheels about a vertical axis wherein said member is configured to steer said vehicle;
a second motor being coupled to said vehicle, said second motor selectively rotating in a first direction and a second direction,
an arm being coupled to said second motor, said arm being oriented perpendicular to a rotational axis of said second motor, said arm having a distal end with respect to said second motor, said arm being selectively urged to swing in a first direction when said second motor rotates in said first direction, said arm being selectively urged to swing in a second direction when said second motor rotates in said second direction, said distal end of said arm being coupled to said member of said linkage, said member urging each of said front wheels to turn in a first direction when said arm is urged in said first direction, said member urging each of said front wheels to turn in a second direction when said arm is urged in said second direction; and
a remote control unit, said remote control unit being in electrical communication with each of said drive unit and said steering unit wherein said remote control unit is configured to facilitate the caregiver to control motion of said vehicle, said remote control unit comprising:
a receiver being coupled to said vehicle, said receiver being electrically coupled to each of said first motor and said second motor,
a first power supply being coupled to said vehicle, said first power supply being electrically coupled to said receiver, said first power supply comprising at least one battery,
a control being configured to be manipulated by the caregiver, said control comprising:
a housing being configured to be gripped, said housing having a first wall,
a processor being positioned within said housing,
a transmitter being positioned within said housing, said transmitter being electrically coupled to said processor, said transmitter being in electrical communication with said receiver,
a steering wheel being rotatably coupled to said first wall of said housing wherein said steering wheel is configured to be manipulated by the caregiver, said steering wheel being electrically coupled to said processor, said steering wheel being selectively rotated in a first direction, said second motor rotating in said first direction when said steering wheel is rotated in said first direction wherein said vehicle is configured to turn left on the support surface, said steering wheel being selectively rotated in a second direction, said second motor rotating in said second direction when said steering wheel is rotated in said second direction wherein said vehicle is configured to turn right on the support surface,
a knob being slidably coupled to said first wall of said housing wherein said knob is configured to be manipulated, said knob being electrically coupled to said processor, said knob being selectively urged between a minimum position and a maximum position, said first motor being turned on to rotate between a minimum speed and a maximum speed corresponding to a position of said knob, a forward button being coupled to said first wall of said housing wherein said forward button is configured to be manipulated, said forward button being electrically coupled to said processor, said first motor rotating in said forward direction when said forward button is manipulated wherein said vehicle is configured to travel forwardly along the support surface, a rearward button being coupled to said first wall of said housing wherein said rearward button is configured to be manipulated, said rearward button being electrically coupled to said processor, said first motor rotating in said rearward direction when said rearward button is manipulated wherein said vehicle is configured to travel rearwardly along the support surface, an antenna being coupled to and extending away from said housing, said antenna being electrically coupled to said transmitter such that said antenna broadcasts a signal generated by said transmitter, a power switch being coupled to said first wall of said housing wherein said power switch is configured to be manipulated, said power switch being electrically coupled to said processor such that said power switch turns said processor on and off, and a second power supply being positioned within said housing, said second power supply being electrically coupled to said processor, said second power supply comprising at least one battery.

\* \* \* \* \*